(12) United States Patent
Ito et al.

(10) Patent No.: US 6,270,443 B1
(45) Date of Patent: Aug. 7, 2001

(54) NEUTRAL CONTROLLER FOR AUTOMATIC TRANSMISSION

(75) Inventors: Yoshiki Ito, Iwata; Shoji Yagi, Hamamatsu, both of (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 09/482,487

(22) Filed: Jan. 13, 2000

(30) Foreign Application Priority Data

Jan. 13, 1999 (JP) ................................................. 11-005926

(51) Int. Cl.⁷ ................................................. B60K 41/26
(52) U.S. Cl. ................................................. 477/114
(58) Field of Search ................................ 477/114, 116

(56) References Cited

U.S. PATENT DOCUMENTS 4,784,020 * 11/1988 Hamano et al. ...................... 477/114
4,885,960 * 12/1989 Maeda et al. ......................... 477/114
5,911,646 * 6/1999 Tsutsui et al. ........................ 477/114

FOREIGN PATENT DOCUMENTS 58-128552  8/1983 (JP) .
59-17051   1/1984 (JP) .
60-220260  11/1985 (JP) .

* cited by examiner

Primary Examiner—Dirk Wright
(74) Attorney, Agent, or Firm—Morrison Law Firm

(57) ABSTRACT

The purpose of the present invention is to provide a neutral control method and a neutral controller for an automatic transmission which improves fuel efficiency and driving characteristics.

According to the present invention, the neutral control method for the automatic transmission includes initiating the neutral control after every predetermined delay time, which begins with the neutral initiation conditions being satisfied, and continuing the neutral control as long as the neutral control initiation conditions remain satisfied. The neutral control ends when the neutral control initiation conditions are no longer satisfied.

16 Claims, 7 Drawing Sheets

NEUTRAL CONTROLLER FOR AUTOMATIC TRANSMISSION

BACKGROUND OF THE INVENTION

1. Field of the Invention

The present invention relates to a neutral controller for an automobile automatic transmission, and a method thereof. More particularly, the present invention relates to the neutral controller that initiate the neutral control after a predetermined period beginning when the neutral control initiation conditions are satisfied, and the method thereof.

2. Description of Prior Art

A neutral controller and a method thereof for an automobile automatic transmission are disclosed by Tokko No. Sho 63-33024, Tokko No. Sho 63-35869 and Tokko No. Sho 63-33585. The prior art is more specifically a neutral controller that automatically puts an automatic transmission into a neutral position when the accelerator is OFF, that is, the throttle is closed and the vehicle is stopped. In the prior art, an engine load and fuel consumption rate may be reduced by automatically putting a gear in a neutral position when the gear select lever is in the D (drive) position, the throttle valve is closed, and the vehicle is stopped.

For a general automatic transmission, application of the brake is added to the above-listed conditions to permit the vehicle to move during idling (so-called creeping). Then, the automatic transmission is put in the neutral position only when the brake is applied. Therefore, the conditions that cause the automatic transmission to initiate the neutral position (neutral control) include the gear select lever is in the D position, the throttle is closed completely, the vehicle is stopped, and the brake is applied.

It is generally known to program the neutral control so that it does not start for a predetermined delay time after all the conditions are satisfied. This is because it must be confirmed that the conditions are satisfied, and the automobile is not just in a temporary operation. This assumes the neutral control is not unintentionally initiated.

The neutral control is cancelled when any one of the above conditions is not satisfied, so that the operator may promptly accelerate the vehicle as he or she wishes. As mentioned above, the neutral control is initiated after the delay time beginning when the initiation conditions are satisfied, and is cancelled when any one condition is not satisfied. Thus, the vehicle may be operated according to the operator's intention.

In the prior art, it improves fuel efficiency to shorten the delay time as much as possible, that is, initiate the neutral control as soon as possible. Regarding real efficiency, the operator does not feel any inconsistency with a short delay time when he stops the vehicle at the traffic light and starts the vehicle again in his normal running conditions. This is because the vehicle stays still for a rather long time while waiting for the traffic light.

However, when slow running and stopping is alternately repeated, such as in a case of a traffic jam, the neutral control is initiated and cancelled during the stop. Under these conditions, the operator notices the vehicle's diminished driving characteristics because a transmitted torque change (a shift shock analogue) is often caused at the cancellation of the neutral control. The transmitted torque change is also often caused when the operator repeatedly operates the vehicle by creeping and brake pumping, such as when parking in a garage.

Even after the neutral control is initiated, such as when waiting for a stop traffic light to change, the neutral control may be cancelled when the operator unintentionally releases the brake. The neutral control is resumed when the operator applies the brake again, causing transmitted torque change. It is possible to avoid these by lengthening the delay time before the neutral control initiation. However, that diminishes the improving effect on the fuel efficiency. In the prior art, the improvement of fuel efficiency and the improvement of driving characteristics in the traffic congestion are mutually exclusive.

SUMMARY OF THE INVENTION

The present invention seeks to provide a neutral control method for an automatic transmission that overcomes the drawback of the prior art, in particular, improves both fuel efficiency and driving characteristics.

The present invention of the neutral control method for the automatic transmission, including the step of initiating the neutral control after the predetermined delay time beginning when the neutral initiation conditions are satisfied, comprises the step of resetting the delay time depending on the vehicle running state (or operating conditions) before the neutral control initiation.

It is a purpose of the present invention to improve driving characteristics during a traffic jam by preventing the frequent neutral-control initiation-and-cancellation repetition. This is achieved by resetting (lengthening) the predetermined delay time after the controller determines that the vehicle is running in a traffic jam, with input.

If the controller determines that the vehicle is running and stopping repeatedly in a regular traffic condition with input from the vehicle operation conditions, the delay time is set in an appropriate length (i.e. shorter than that in the traffic jam), before the neutral control initiation, so that the neutral control is promptly initiated. This altered delay time reduces the fuel consumption rate during a vehicle stop for a traffic light, since the duration of a traffic light stop may be forecast.

The vehicle operation conditions include the vehicle speed and the throttle opening degree. During a traffic jam, the vehicle speed tends to be lower than a certain value and the throttle opening degree tends to be less than a certain value. Therefore, it is possible to determine that the vehicle is operating in a traffic jam if the vehicle speed does not exceed a predetermined value (or threshold) or if the throttle opening degree is lower than a predetermined value (or threshold). Once determined that the vehicle operating an a traffic jam, the delay time may be reset longer.

BRIEF DESCRIPTION OF THE DRAWINGS

FIG. 7(A) shows a change of the throttle opening degree (equivalent to the engine load) against time. FIG. 7(B) shows a change of the vehicle speed against time. FIG. 7(C) shows a change of the brake application against time. FIG. 7(D) shows a change of the shift position against time. FIG. 7(E) shows a change of the continuous time (or duration) when the neutral control initiation conditions are satisfied. FIG. 7(F) shows a change between under-control and out-of control of the neutral control.

DETAILED DESCRIPTION OF THE PREFERRED EMBODIMENT

Referring now in more detail to the drawings, in which like numerals refer to like elements throughout the several views, a preferred embodiment of the present invention is described.

The Whole System

Figure 2:
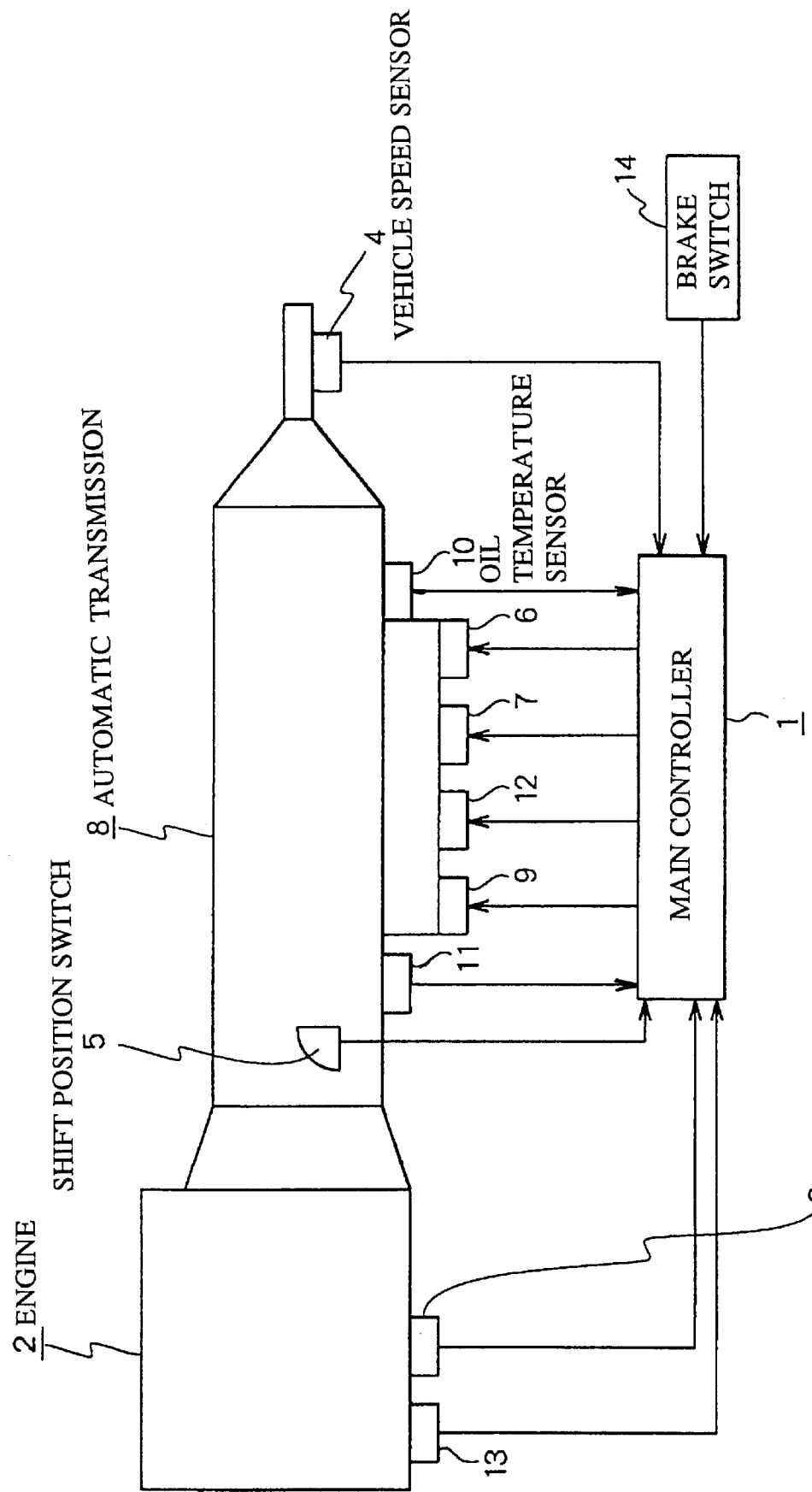
FIG. 2 is a schematic diagram of the system including the neutral controller of a preferred embodiment of the present invention.

A system block diagram of a preferred embodiment of the present invention is illustrated in FIG. 2. The system comprises an automatic transmission 8, an engine 2 which transmits driving force or torque to the automatic transmission 8, and a main controller 1 which controls the automatic transmission 8. The automatic transmission 8 is equipped with a shift position switch 5, an input-shaft revolution sensor 11, a vehicle speed sensor 4, and an oil temperature sensor 10. The automatic transmission 8 is also equipped with a line pressure solenoid 9, a first shift solenoid 6, a second shift solenoid 7, and a lock-up solenoid 12.

The engine 2 is equipped with an engine revolution sensor (crank angle sensor) 13 and a throttle opening degree sensor 3. The main controller 1 receives a throttle opening degree signal from the throttle opening degree sensor 3 that detects throttle opening degree (equivalent to the load of the engine 2), a vehicle speed signal from the vehicle speed sensor 4 that detects the vehicle speed, a shift position signal from the shift position switch 5 that detects the shift position, an oil temperature signal from the oil temperature sensor 10 that detects the temperature of the hydraulic fluid, a revolution speed signal from the input-shaft revolution sensor 11 that detects the revolution speed of the input-shaft from the torque converter for the automatic transmission, engine revolution speed signal from the engine revolution speed sensor (crank angle sensor) 13 that detects an engine revolution speed, and a brake signal from the brake switch 14 that detects brake operation status.

The main controller transmits shift control signals to the first shift solenoid 6 and the second shift solenoid 7. Then, each shift solenoid 6, 7 operates to select and engage certain friction elements of the automatic transmission 8 so that the automatic gear shifting may be controlled. During the neutral control described blew, the second gear is set in order to prevent rolling down the hill. Thus, the driving torque for forward travel is not transmitted, but reverse revolution caused by rolling back is prevented.

The main controller 1 transmits a line pressure control signal to the line pressure solenoid 9 to control the line pressure that controls each shift solenoid 6, 7. Therefore, the line pressure is controlled for the engagement of the friction elements.

During the neutral control, the line pressure solenoid 9 provides a low clutch (not shown) with the hydraulic pressure, which has reduced pressure from the line pressure. With the pressure the low clutch is kept in a partially engaged state. Here, partially engaged is understood to mean to torque is partially transmitted by friction although opposing plates rotate with a differential revolution speed. When the vehicle runs at a constant speed greater than a threshold speed, the main controller 1 transmits a s torque-converter-direct-connection-clutch-control signal to the lock-up solenoid 12. If the transmission is in third or fourth gear, the torque-converter-direct-connection clutch (not shown) is engaged. If the transmission is in first or second gear, the hydraulic pressure provided to the low clutch is alternatively controlled by normal line pressure or reduced line pressure mentioned above.

Main Controller

Figure 1:
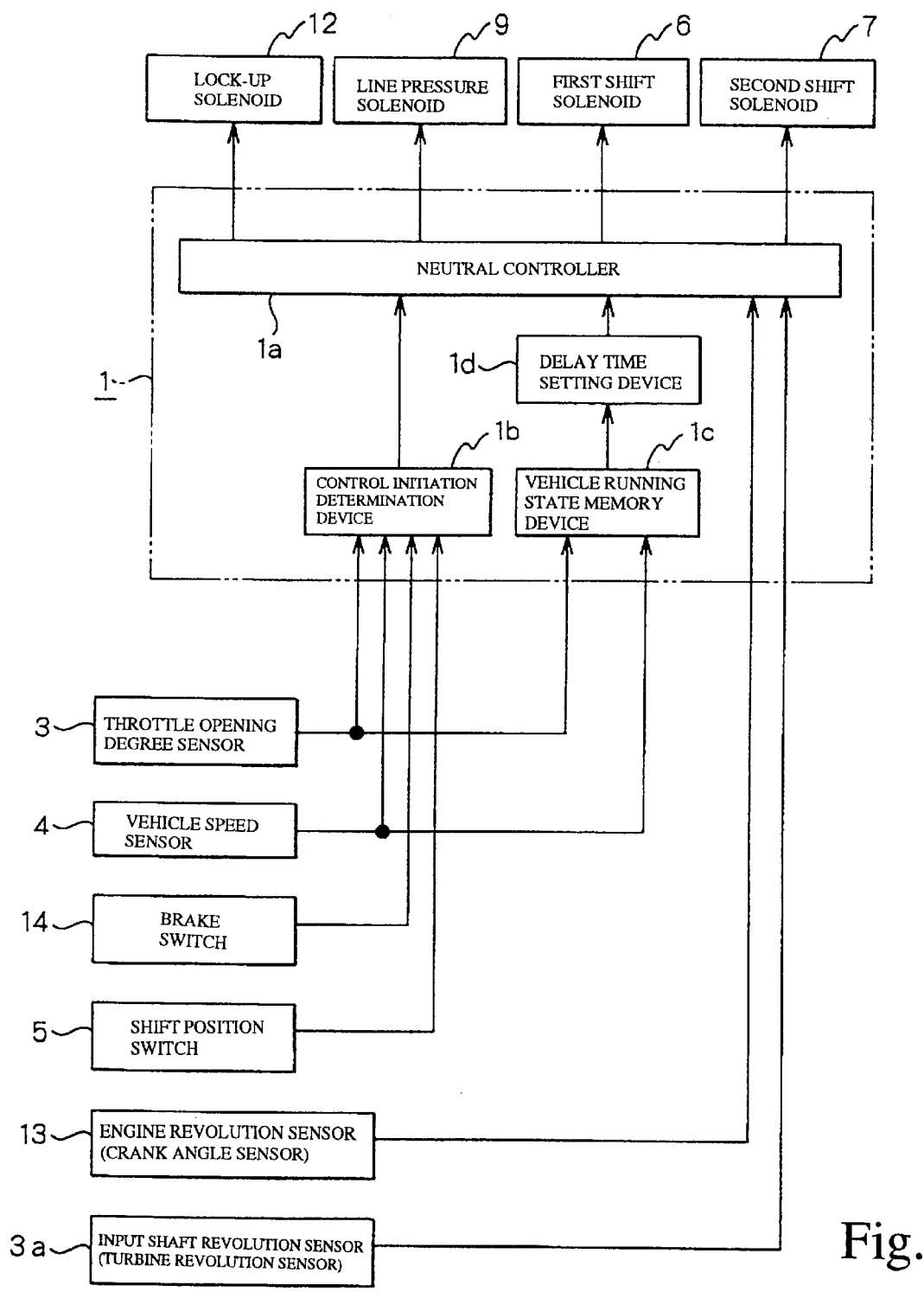
FIG. 1 is a block diagram of the neutral control system according to a preferred embodiment of the present invention.

A block diagram of the main controller 1 of the preferred embodiment of the present invention is illustrated in FIG. 1. The main controller 1 comprises a control-initiation-determination device (or a control-initiation-determination means) 1b, a vehicle-running-state-memory device (or a vehicle-running-state-memory means) 1c, a delay-time-setting device (or a delay-time-setting means) 1d that sets the delay time before the initiation of the neutral control, a neutral controller (or a neutral control means) 1a that conducts the neutral control from the information transmitted by these devices (or means) 1b, 1c, 1d. The control initiation determination device 1b determines whether the initiation conditions for the neutral control are satisfied with input including the throttle opening degree (engine load) detected by the throttle opening degree sensor 3, the vehicle speed detected by the vehicle speed sensor 4, the brake operation state determined from the brake switch 14, and the shift position determined from the shift position switch 5.

Further, the vehicle-running-state-memory device 1c determines whether the vehicle speed exceeds the predetermined value (or threshold) after the previous neutral control is cancelled or ended, and stores the results. The delay-time-setting device 1d sets the delay time based on the results determined by the vehicle-running-state-memory device 1c.

The neutral controller 1a initiates the neutral control after the delay time set, beginning from when the neutral-control-initiation conditions mentioned above are satisfied and confirmed. Once the neutral control is initiated, a shift signal to shift the transmission to the second gear is transmitted to both the first shift solenoid 6 and the second shift solenoid 7. Then, a signal to switch the line pressure provided for the low clutch from a normal line pressure to the reduced line pressure, is transmitted to the lock-up solenoid 12.

The main controller 1 transmits a signal to the line pressure solenoid 9 to adjust the revolution speed difference closer to a certain value between the engine revolution speed (the input-shaft revolution speed of the torque converter) detected by the engine revolution sensor (crank angle sensor) 13 and the input shaft revolution speed (output-shaft revolution speed of the torque converter) detected by the input-shaft revolution sensor 11 of the automatic transmission 8.

Actual Neutral Control

Figure 3:
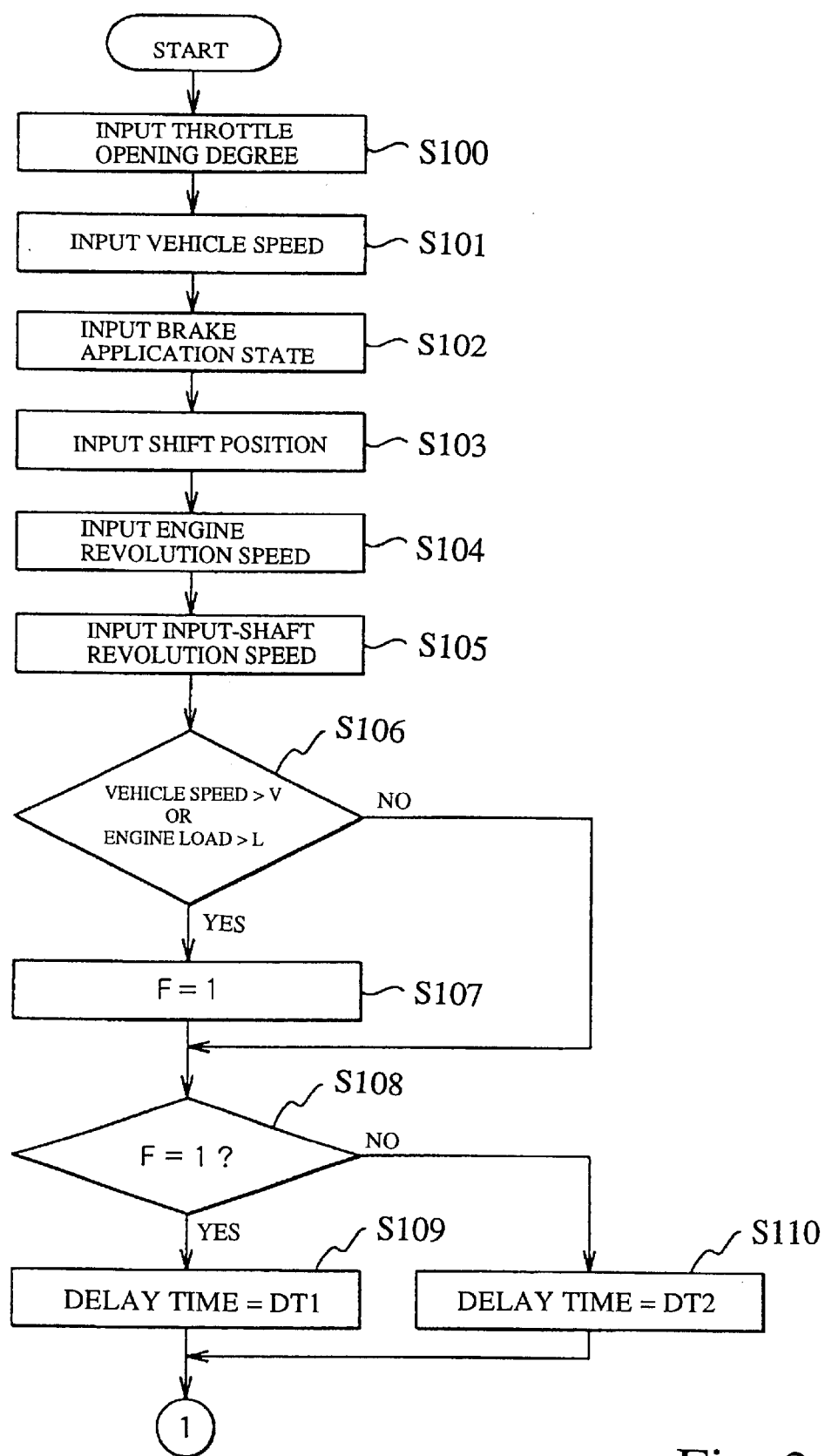
FIG. 3 is a flow chart to set a delay time of a preferred embodiment of the present invention.
Figure 4:
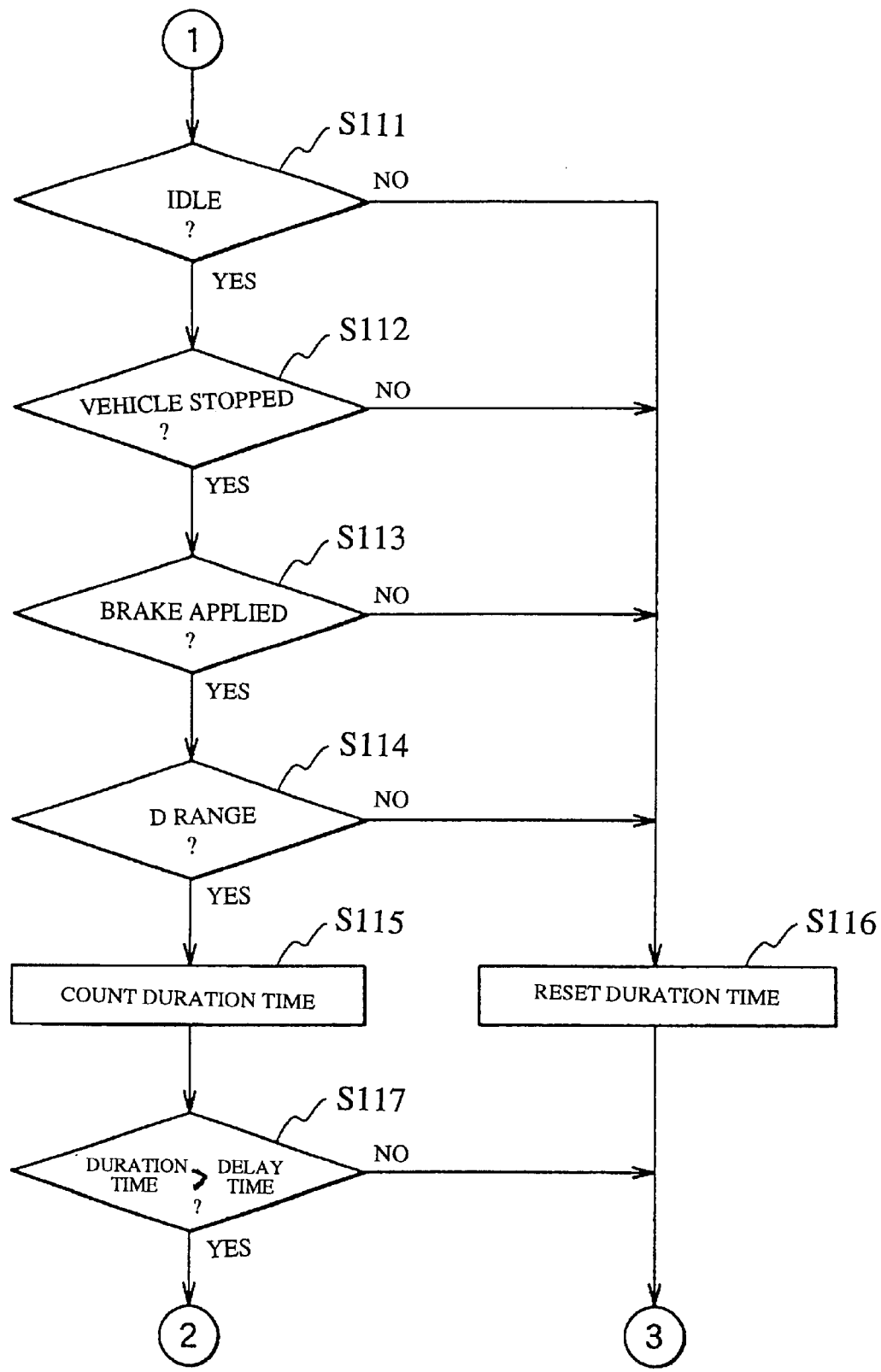
FIG. 4 is a flow chart to determine initiation of the neutral control according to a preferred embodiment of the present invention.
Figure 5:
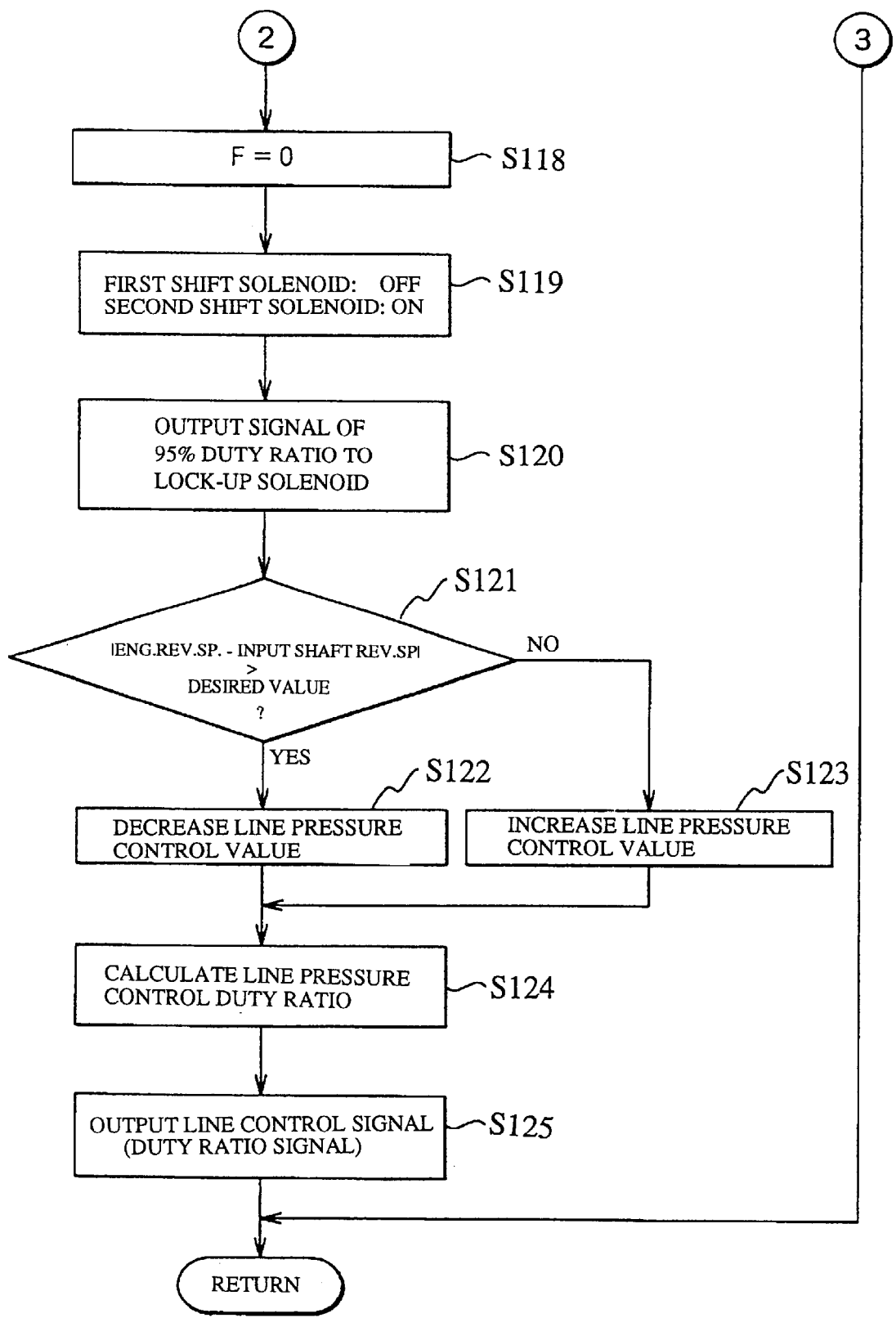
FIG. 5 is a flow chart for the neutral control of a preferred embodiment of the present invention.

FIGS. 3, 4 and 5 are flow charts which illustrate the steps for the neutral control of the preferred embodiment according to the present invention. The process flow is repeatedly started at a certain interval to repeat the sequence of steps in a manner known to those skilled in the art.

Acquisition of the Vehicle Running State

The vehicle-running-state-memory device 1c, best illustrated in FIG. 1, first receives the vehicle-running-state information from each sensor. More specifically, as shown in FIG. 3, the throttle opening degree, which is equivalent to the engine load, is received from the signal transmitted by the throttle opening degree sensor 3 in the step S100. The vehicle speed information is determined from the signal transmitted by the vehicle speed sensor 4 in the step S101. The brake application state is determined from the signal transmitted by the brake switch 14 in step S102. The shift position is determined from the signal transmitted by the shift position switch 5 in step S103. The engine revolution speed is determined from the signal transmitted by the engine revolution sensor (crank angle sensor) 13 in the step S104. The input-shaft revolution speed of the automatic transmission 8 is determined from the signal transmitted by the input-shaft revolution sensor (turbine revolution sensor) 11 in step S105.

Delay Time Setting

Now, the delay time setting is explained in detail. It is determined whether the vehicle speed exceeds the preset vehicle speed value V or whether the engine load exceeds the preset load value L in the step S106. If either value is exceeded, it is determined that the vehicle is not running in a traffic jam, and the program proceeds to the step S107 to substitute the value 1(one) in a control flag F (let F=1) and further proceeds to the step S108. On the other hand, if at step S106 neither value is exceeded, the program skips the step S107 and proceeds to the step S108. This is because the vehicle may continuously creep in a heavy traffic.

Now, in steps S108, S109 and S110, the delay time is determined by the value of F. When F=1, the delay time is set for the delay time DT1, which is rather short, since it is determined that the vehicle is not running in a traffic jam. When F=0, the delay time is set for the delay time DT2, which is rather long, since it is determined that the vehicle is caught in a traffic jam. Then, the program proceeds to the next step best illustrated in FIG. 4.

Determination of Neutral Control Initiation Condition Satisfaction

As illustrated in FIG. 4, it is determined whether the neutral control initiation conditions are satisfied in steps S111 through S114. More specifically, the control-initiation-determination-device determines whether the throttle opening degree is completely closed and the engine is in an idle state (step S111), whether the vehicle is stopped (step S112), whether the brake is applied (step S113) and whether the shift lever is in the D position (step S114). The neutral control initiation conditions are satisfied when the answer to each of these questions is "yes". Otherwise, the neutral control initiation conditions are not satisfied. In determining the throttle opening degree, the completely closed state may include that state wherein the throttle opening degree is equal to or less than a certain value, as well as the completely closed state. The state wherein the vehicle is stopped may include when the vehicle speed is equal to or less than a certain value near 0 km/h as well as the completely stopped state.

If the neutral control initiation conditions are satisfied, the process proceeds to the step S115 to count a duration time, i.e. the period of time when the conditions are satisfied (step S115) and then proceeds to the next step S117. If the neutral-control-initiation conditions are not satisfied, the process proceeds to the step S116 to reset the duration time and then proceeds to the step of return shown in FIG. 5. When the neutral control initiation conditions are satisfied, it is determined whether the duration time exceeds a preset value of the delay time (step S117). If the duration time exceeds the preset value, the process proceeds to the next step to initiate the neutral control. If it does not, the process proceeds to the step of return shown in FIG. 5.

Neutral Control

In the step S118 the control flag F is cleared (F=0) and the vehicle running state, after the neutral control is cancelled or ended, is stored in the vehicle running state memory device 1c. In the step S119 the first shift solenoid is set OFF and the second shift solenoid is set ON so that the transmission may be put into second gear. In this manner, a one-way clutch operates to prevent the output-shaft from revolving backward so that the vehicle may be prevented from rolling back on the hill, although the creep torque is decreased due to the neutral control.

In the step S120 the neutral controller 1a (shown in FIG. 1) transmits a control signal of 95% duty ratio to the lock-up solenoid, setting the line pressure greater if the duty ratio is higher. In this manner, the hydraulic pressure provided to the low clutch is switched from the regular line pressure to a slightly reduced line pressure.

The line pressure solenoid 9 (shown in FIGS. 1 and 2) is controlled in the steps S121 through S125. In the step S121, it is first determined whether or not an absolute value of differential revolution speed, as calculated by the difference between the engine revolution speed and the input-shaft revolution speed of the shift gear mechanism (the differential revolution speed between the input- and output-shafts), is greater than a desired value. If the absolute value of differential revolution speed is greater than the desired value, it is determined that the hydraulic pressure provided to the low clutch is too high and the process proceeds to the step S122 to decrease the control value for the line pressure and to reduce the hydraulic pressure provided to the low clutch. On the other hand, if the differential revolution speed is less than the desired value, it is determined that the hydraulic pressure provided to the low clutch is too low and the process proceeds to the step S123 to increase the control value for the line pressure. Thus, the line pressure is feedback-controlled to bring the differential revolution speed between the input- and the output-shafts of the torque converter closer to the desired value so that the low clutch may be kept in a partially engaged state.

Figure 6:
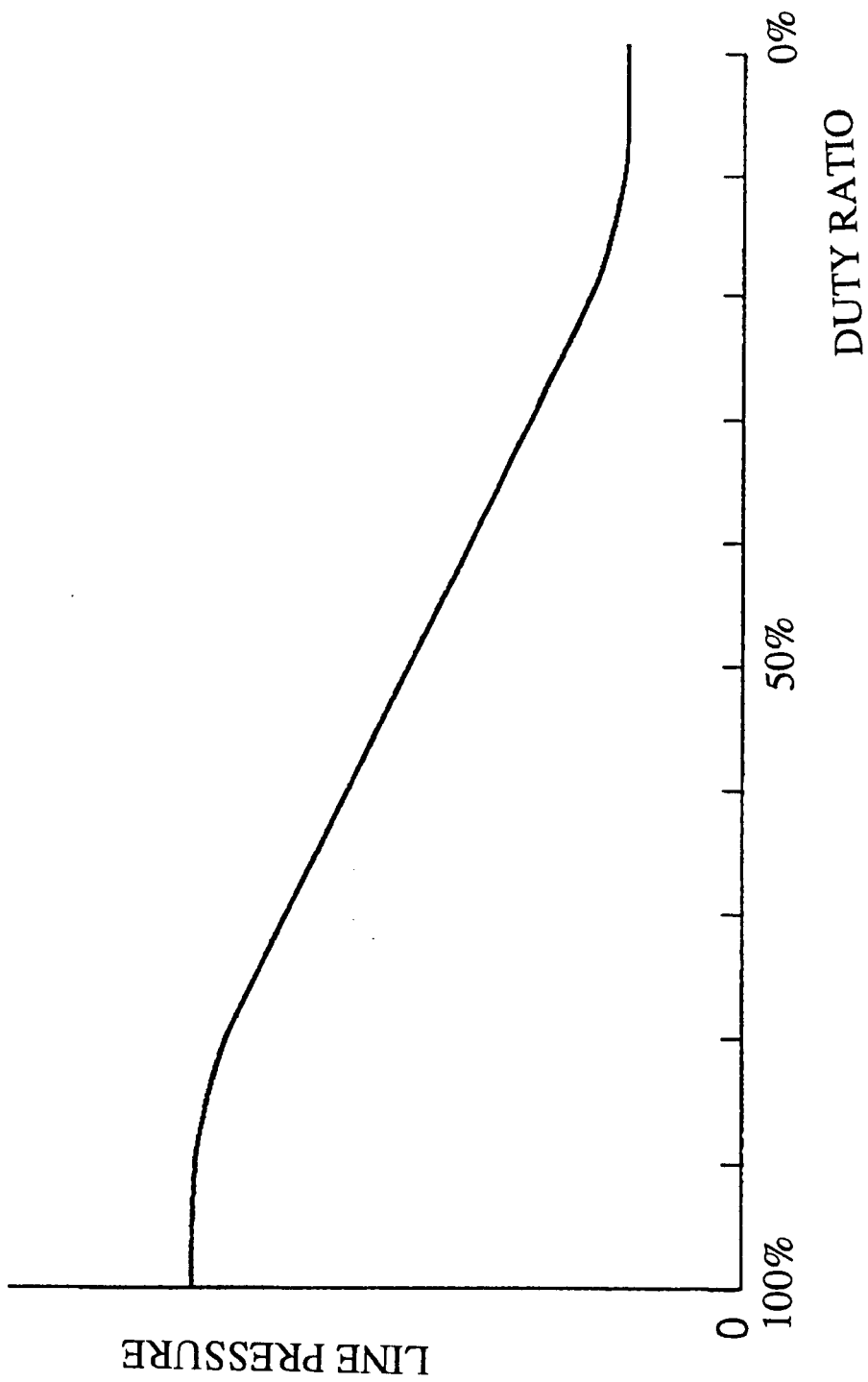
FIG. 6 is a graph to show the relationship between the line pressure and the duty ratio signal to the line pressure solenoid.

In the step S124, the line pressure control value is converted to the control duty ratio as shown in FIG. 6. The relation between the line pressure and the control duty ratio is not completely linear, but is non-linear in some region as illustrated in FIG. 6. Therefore, if the line pressure is feedback-controlled directly with the control duty ratio, it is not easy to adjust a gain of the feedback control in every region since the line pressure rate of change varies at the same or different rate as the duty ratio rate of change. This is why the line pressure control value is converted to the control duty ratio (S124).

In the step S125, the neutral controller 1a (shown in FIG. 1) transmits a control signal to the line pressure solenoid 9 according to the control duty ratio of the step S124. When the neutral control is not made, other controls (not shown) such as shift control, lock-up control, line pressure control and so on may be made separately.

Figure 7:
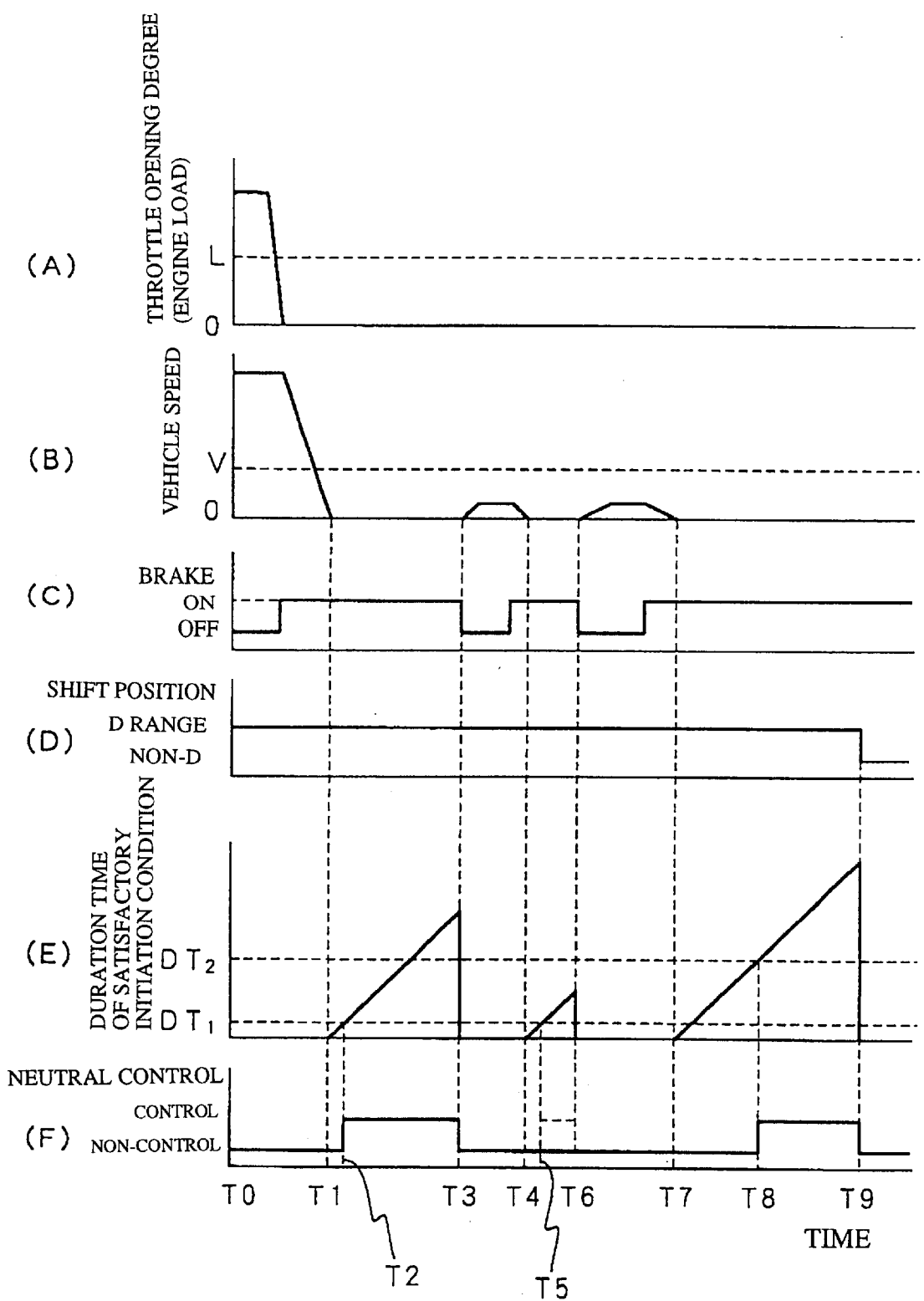
FIG. 7 is a time chart for a preferred embodiment of the neutral control of the present invention.

Now, the neutral control operation will be described according to the time chart shown in FIG. 7. The time chart illustrates a certain running state. At the time T0, the vehicle is determined to be in a normal running state and not in a traffic jam. When, the throttle is closed, the vehicle speed reduces to and becomes zero, which means the vehicle is stopped. Then, the neutral-control-initiation conditions are satisfied at the time T1. After the delay time DT1, the neutral control is initiated as shown by T2 in FIG. 7(E). The delay time DT1 is the delay time for a non-traffic-jam state. The neutral control is ended due to the non-brake-application at the time T3.

Later, the neutral-control-initiation conditions are satisfied again at the time T4. Because neither the engine load exceeds the preset value L nor the vehicle speed exceeds the preset value V since the time T3, the vehicle is determined to be running in a traffic jam and the delay time is set for the delay time DT2. Therefore, the neutral control is not initiated at the time T6, when the neutral-control-initiation conditions are not satisfied, since it is before passing the delay time DT2. Regarding the neutral control system of the prior art, the neutral control could be made as shown in the dotted line from the time T5 to T6 in FIG. 7(F) since the delay time is DT1.

Thus, according to the present invention, the neutral control is not made when the vehicle is stopped for a short period during the slow running and stopping of a traffic jam. The neutral-control-initiation conditions are satisfied at the time T7. Since the delay time is DT2 like the previous case, the neutral control is initiated at the time T8 after DT2 is passed. The neutral control is ended at the time T9 because the shift lever is in a position other than D.

As mentioned so far, the neutral control is not conducted when the vehicle is stopped for a short period during the slow running and stopping of a traffic jam.

In the preferred embodiment of the present invention, the vehicle is determined to be running in a traffic jam when neither the vehicle speed nor the throttle opening degree (engine load) exceeds certain preset values. Other means may be employed to determine whether the vehicle is running in a traffic jam or not. For example, traffic jam conditions may be determined when the average vehicle speed and the average engine load, which are averaged for a predetermined period of time before the neutral control initiation conditions are satisfied, are equal to or less than certain predetermined values (or thresholds).

Achievement

As described above, the period before initiating the neutral control should vary depending on the vehicle running state (e.g. slow running in a heavy traffic). Therefore, when the vehicle is stopped after running at speed more than a certain value like running in an uncongested area, the neutral control is started (or initiated) after a short delay time so as to improve the fuel efficiency. On the other hand, when extremely low speed running and stopping are alternately repeated, such as will occur during a traffic jam, the neutral control is not started (or initiated) for short stoppings. Thus, the driving torque change around the end of neutral control is much less frequently caused to keep good driving characteristics. According to the present invention, it becomes possible to improve both fuel efficiency and driving characteristics.

According to the present invention, it may be determined whether the vehicle is in normal running or traffic-jam conditions by determining the throttle opening degree and the vehicle speed according to the present invention. The throttle opening degree and the vehicle speed may be acquired from the throttle opening degree sensor and the vehicle speed sensor originally equipped for the conventional vehicle. Therefore, a new equipment such as a new sensor is not necessarily needed to perform the neutral control.

What is claimed is:

1. A method of neutral control for an automatic transmission comprising the steps of:
   inputting data necessary for neutral control initiation conditions;
   determining whether the neutral control initiation conditions are satisfied;
   initiating a neutral control after a predetermined delay time which begins with the neutral control initiation conditions being satisfied;
   continuing the neutral control as long as the neutral control initiation conditions remain satisfied; and
   ending the neutral control when the neutral control initiation conditions are no longer satisfied;
   wherein the predetermined delay time may vary from an original value according to a vehicle's running state before the neutral control initiation conditions are initially satisfied.

2. The method of claim 1, wherein the vehicle's running state includes a vehicle speed and a throttle opening degree.

3. The method of claim 2, further comprising the steps of:
   detecting the vehicle speed;
   storing the detected vehicle speed;
   setting the predetermined delay time longer than the original value, if no stored vehicle speed exceeds a predetermined value for a period of time after a previous neutral control ends and before a subsequent neutral control begins, or setting the predetermined delay time as the original value.

4. The method of claim 2, further comprising the steps of:
   detecting the throttle opening degree;
   storing the detected throttle opening degree; and
   setting the predetermined delay time longer than the original value, if no stored throttle opening degree exceeds a predetermined value for a period of time after a previous neutral control ends and before a subsequent neutral control begins, or setting the predetermined delay time as the original value.

5. The method of claim 2, further comprising the steps of: detecting the vehicle speed and the throttle opening degree repeatedly; storing the detected vehicle speed and the throttle opening degree; and
   setting the predetermined delay time longer than the original value, if neither stored vehicle speed nor stored throttle opening degree exceeds predetermined values for a period of time after a previous neutral control ends and before a subsequent neutral control begins, or setting the predetermined delay time as the original value.

6. The method of claim 2, further comprising the steps of: detecting the vehicle speed repeatedly; storing and averaging the detected vehicle speed; and
   setting the predetermined delay time longer than the original value, if no averaged vehicle speed exceeds a predetermined value for a period of time after a previous neutral control ends and before a subsequent neutral control begins, or setting the predetermined delay time as the original value.

7. The method of claim 2, further comprising the steps of: detecting the throttle opening degree repeatedly; storing and averaging the detected throttle opening degree; and
   setting the predetermined delay time longer than the original value, if no averaged throttle opening degree exceeds a predetermined value for a period of time after a previous neutral control ends and before a subsequent neutral control begins, or setting the predetermined delay time as the original value.

8. A neutral controller comprising:
   a control-initiation-determination device which determines whether neutral-control-initiation conditions are satisfied by acquiring information about a vehicle's running state;
   a vehicle-running-state-memory device storing a detected vehicle's running state; and
   a delay-time-setting device setting a delay time for a period of time after the neutral-control-initiation conditions are satisfied and before a neutral control is actually initiated.

9. The neutral controller of claim 8, further comprising;

a neutral controller conducting the neutral control according to information from the control-initiation-determination device and from the delay-time-setting device, and wherein the delay-time-setting device may change the delay time from an original value according to the vehicle running state stored by the vehicle-running-state-memory.

10. The neutral controller of claim 9, wherein the vehicle running state includes a vehicle speed and a throttle opening degree.

11. The neutral controller of claim 10, further comprising:

a vehicle speed sensor which detects the vehicle's speed for a period of time after an end of a previous neutral control and before a beginning of a subsequent neutral control;

wherein the delay-time-setting device sets the delay time longer than the original value if no stored vehicle speed exceeds a predetermined value, or the delay-time-setting device sets the delay time as the original value.

12. The neutral controller of claim 10, further comprising:

a throttle-opening-degree sensor which detects a throttle opening degree for a period of time after an end of a previous neutral control and before a beginning of a subsequent neutral control;

wherein the delay-time-setting device sets the delay time longer than the original value if no stored throttle opening degree exceeds a predetermined value, or the delay-time-setting device sets the delay time as the original value.

13. The neutral controller of claim 10, further comprising:

a vehicle speed sensor and a throttle-opening-degree sensor detecting the vehicle speed and the throttle opening degree, respectively, for a period of time after an end of a previous neutral control and before a beginning of a subsequent neutral control, wherein the delay-time-setting device sets the delay time longer than the original value if neither stored vehicle speed nor stored throttle opening degree exceeds a predetermined value, or the delay-time-setting device sets the delay time as the original value.

14. The neutral controller of claim 10, further comprising:

a vehicle speed sensor which detects the vehicle's speed for a period of time after an end of a previous neutral control and before a beginning of a subsequent neutral control;

wherein the vehicle-running-state-memory device calculates an average of the stored vehicle speed for the period of time; and wherein the delay-time-setting device sets the delay time longer than the original value if the averaged vehicle speed does not exceed a predetermined value, or the delay-time-setting device sets the delay time as the original value.

15. The neutral controller of claim 10, further comprising:

a throttle-opening-degree sensor which detects a throttle-opening degree for a period of time after an end of a previous neutral control and before a beginning of a subsequent neutral control;

wherein the vehicle-running-state-memory device calculates an average of the stored throttle-opening degree for the period of time; and wherein the delay-time-setting device sets the delay time longer than the original value if the averaged throttle opening degree does not exceed a predetermined value, or the delay-time-setting device sets the delay time as the original value.

16. The neutral controller of claim 10, further comprising:

a vehicle speed sensor and a throttle-opening-degree sensor which detects the vehicle's speed and a throttle-opening degree, respectively, for a period of time after an end of a previous neutral control and before a beginning of a subsequent neutral control;

wherein the vehicle-running-state-memory device calculates an average of the stored vehicle speed and the stored throttle-opening degree for the period of time; and wherein the delay-time-setting device sets the delay time longer than the original value if neither averaged vehicle speed nor averaged throttle opening degree exceed predetermined values, or the delay-time-setting device sets the delay time as the original value.

* * * * *